Patented Apr. 2, 1929.

1,707,800

UNITED STATES PATENT OFFICE.

ALBERT K. EPSTEIN, OF CHICAGO, ILLINOIS.

MARGARINE AND PROCESS OF MAKING SAME.

No Drawing. Application filed March 8, 1926. Serial No. 93,324.

This invention relates to margarine and the process of making the same, and consists of a new and improved process which has certain advantages in that among other things, both time and space are economized during the manufacturing processes.

In the manufacture of oleomargarine, combinations of oils and fats are emulsified with milk and the emulsion is stabilized by subjecting it to a lower temperature whereby solidified discrete particles are produced.

The process of stabilizing the emulsion is carried out in various ways such as by allowing a stream of cold water to strike a continuous flowing stream of the emulsion as it leaves the emulsifying apparatus and catching the congealed particles of the emulsion together with the cold water in a suitable truck or box from which excess cold water is allowed to drain upon standing.

Or an improved and novel way is also described in U. S. Patent No. 1,507,426 which consists of subdividing the emulsion by means of pressure and a spray nozzle after it leaves the emulsifying apparatus into individual discrete particles and causing these individual particles to impinge with force upon a body of moving cold water thereby submerging them and crystallizing them instantaneously. These small individual crystals are then taken from the vat and placed in suitable trucks, as shown in the patent. This process has certain advantages over other methods of crystallization.

The solid particles of the emulsion whether congealed by the older method or crystallized in fine particles as described in U. S. Patent No. 1,507,426 are cold, having been immersed in cold water and therefore it is desirable to temper them in a relatively warmer room for long periods of time until they obtain a temperature sufficiently high to permit being readily kneaded together into a plastic butter-like mass.

In the methods heretofore used for tempering, the cold particles were placed in trucks and these trucks put into a large room with steam coils for maintaining a suitable relatively higher temperature so as to warm up the particles.

By tempering I mean that step in the process by which the solidified cold particles are brought to a temperature which will permit kneading them into a plastic mass.

On account of oils and fat being a poor conductor of heat, and air separating one particle from another, the heat of the warm room does not penetrate but a few inches from the surface of the material even after long exposure, the particles inside the mass, or those in the lower part of the truck remaining relatively cold. In order to raise the temperature of the inner particles it has been necessary to stir up the mass at frequent intervals, exposing new particles to the warm atmosphere entailing a great deal of labor and expense. Even with this additional work the tempering of nut margarine for example, takes from 18 to 24 hours and then all the particles are not of uniform temperature.

Another disadvantage of the process of "tempering" as carried out heretofore is that the margarine was exposed to the air for long periods of time thereby subjecting it to the possibility of bacterial contamination from the air, thus curtailing the flavor and keeping quality of the product.

One of the features of the invention is directed to the reduction of time and labor involved in the tempering process by cutting down or eliminating the labor involved in stirring the mass which was required to expose the inside particles to the warmer atmosphere; another feature is the hastening of the tempering period thus also economizing in the factory space heretofore required for the many storage trucks needed during the tempering process; another feature is the reduction in time of exposure thus minimizing the danger of bacterial contaminations. Other advantages will be apparent from an understanding of the improved process.

Generally stated the invention looks to the method of tempering a mass of solidified particles of the emulsion by changing, separating or varying the mass so as to increase the surface of exposure and exposing the varied mass to a warmer medium as of liquid or air, the temperature of which is high enough to warm the particles so they may be worked into a plastic mass, but which is below the melting point of the emulsion; and to which medium the increased surface of exposure is brought in contact so as to hasten the tempering without the handling heretofore required.

The invention is preferably carried out by bringing the cold particles, after they have been solidified by the cold water into contact with relatively warmer water so that each individual cold particle is surrounded with the relatively warmer water thereby raising its temperature in a short length of time.

The following is an illustration of one means of carrying out my process. For example in the case of nut margarine, the solidified particles of the emulsion have a temperature varying from 40 to 50° F. depending upon the temperature of the cold water and the time of contact. These cold particles are placed in trucks of about three feet wide, three feet deep and six feet long, with openings in the bottom or sides through which the water may drain. When the larger portion of the cold water has drained out taking from 15 to 30 minutes, relatively warmer water of a temperature of about 65° F., is sprayed over the particles until all the particles are thoroughly wetted by the warmer water and attain a temperature from 58° F. to 60° F. The warmer water is then allowed to drain from the truck taking 15 to 30 minutes after which the particles may be worked together on a butter working machine into a plastic butter-like mass.

Another method by which this invention may be carried out is to reduce or vary the size of the mass of particles of margarine by conveying them in thin layers into a warmer medium so as to give the warmer medium a chance to come in contact with the particles and raise their temperature in a relatively shorter period of time. For example, the particles may be conveyed from the chilling or crystallizing vat by means of a moving belt or any other suitable contrivance into a vat containing relatively warmer fluid as water. In this manner, the particles will be surrounded by the relatively warmer water and warm up the particles to the desired temperature.

Another form in which this invention may be carried out is to convey the cold particles of oleomargarine from the crystallizing or chilling vat by means of a suitable moving belt in thin layers into a chamber containing relatively warmer air or gaseous medium thereby allowing the warmer air or gaseous medium to come in contact with the thin layers of the particles of oleomargarine and bring them to a higher temperature in a relatively short period of time.

I do not limit myself to the type or size of container in which, or upon which the cold particles are bathed or surrounded with relatively warmer water, nor to the method by which the cold particles are brought in contact with a body of relatively warmer water, nor to the temperature of the relatively warmer water which is poured or applied to the cold particles, or in which they may be submerged or bathed. Any convenient means by which the cold congealed particles of the emulsion may be brought to a higher temperature by surrounding them with relatively warmer water is within the scope of my invention.

Therefore I do not desire to be limited to the exact methods described but aim to cover all that which comes within the spirit and scope of the appended claims.

I claim:

1. In the process of making margarine, the method of tempering solidified discrete particles of emulsion which consists of exposing the particles to a liquid of a warmer temperature but which is below the melting point of the solidified emulsion particles.

2. The process of making margarine which consists of forming warm liquid emulsion from fatty substances and aqueous liquids, reducing this emulsion into a cooled solidified mass, exposing the cold mass to a warm liquid of a temperature below the melting point of the solidified emulsion, and then working the warmed particles into a plastic mass.

3. The process of making margarine which consists of forming warm liquid emulsion from fatty substances and aqueous liquids, reducing this emulsion into cooled solidified discrete particles, exposing the cooled particles to a warm liquid of a temperature below the melting point of the solidified emulsion, and then working the warmed particles into a plastic mass.

4. The process of making margarine which consists of forming warm liquid emulsion from fatty substances and aqueous liquid, stabilizing said emulsion by cooling it to a non-fluid state through contact with relatively colder water, and warming up the cold emulsion by means of relatively warmer water the temperature of which is below the melting point of the stabilized emulsion, separating it from the excessive water, and working it into a plastic mass.

5. The process of making margarine, which consists of forming warm liquid emulsion from fatty substances and aqueous liquid, solidifying said emulsion into particles by means of contact with relatively colder water, separating the cold solidified particles from the water and bringing the cold solidified particles to a warmer temperature by submerging them in a body of relatively warmer water below the melting point of the solidified emulsion, separating the warm particles from the water, and working into a plastic mass.

6. In the process of making margarine in which the emulsion is solidified into minute discrete particles and placed in containers, the method of tempering the emulsion particles in the container which consists of exposing the particles to a liquid of a warmer temperature but which is below the melting point of the solidified emulsion particles.

7. The process of making margarine which consists of forming warm liquid emulsion from fatty substances and aqueous liquid, stabilizing said emulsion by bringing it in contact with a relatively colder medium the temperature of which is sufficiently lower to solidify the emulsion separating the solidified emulsion from the colder medium and exposing it in a thin layer to a relatively warmer medium the temperature of which is not sufficient to melt the solidified emulsion, and working the warmed up particles into a plastic mass.

8. The process of making margarine which consists of forming warm liquid emulsion from fatty substances and aqueous liquid, and stabilizing said emulsion by bringing it into contact with a colder medium the temperature of which is sufficient to solidify it into discrete particles, and conveying them in thin layers through a body of relatively warmer medium the temperature of which is below the melting point of the solidified emulsion, and working the warmed particles into a plastic mass.

In witness whereof, I hereunto subscribe my name this 2nd day of March, 1926.

ALBERT K. EPSTEIN.